United States Patent [19]

Gotoh et al.

[11] Patent Number: 5,299,072
[45] Date of Patent: Mar. 29, 1994

[54] VIDEO AND AUDIO SIGNAL RECORDING APPARATUS WITH EDITING-USE ERASE HEADS

[75] Inventors: Yoshiho Gotoh, Osaka; Tatsushi Bannai; Souichiro Fujioka, both of Sakai, all of Japan

[73] Assignee: Matsushita Electric Industrial Co., Ltd., Osaka, Japan

[21] Appl. No.: 794,015

[22] Filed: Nov. 19, 1991

[30] Foreign Application Priority Data

Nov. 21, 1990 [JP] Japan .................. 2-319019
Apr. 1, 1991 [JP] Japan .................. 3-068253

[51] Int. Cl.$^5$ ............................. G11B 5/02
[52] U.S. Cl. ............................. 360/57; 360/14.1; 360/66
[58] Field of Search .......... 360/57, 66, 14.1, 48, 360/18, 118, 13; 358/311, 341

[56] References Cited

U.S. PATENT DOCUMENTS 3,946,440 3/1976 Saito ................... 360/118
4,879,609 11/1989 Kozuki et al. ............ 360/66

FOREIGN PATENT DOCUMENTS

0188305 11/1983 Japan .................. 360/57
1-106382 4/1989 Japan .

Primary Examiner—Andrew L. Sniezek
Attorney, Agent, or Firm—Wenderoth, Lind & Ponack

[57] ABSTRACT

A video and audio signal recorder for recording signals on tracks records signals of each editorial unit (e.g. video or audio signals of a field) on a recording medium so as to form a recording area composed of recorded tracks and a guarding area provided between two recording areas, and erases recorded data from a recording area isolated by the guarding area using two kinds of erase heads consisting of: a first erase head having a track width which is twice as wide as the track width and movable in a track length direction so as to track the full width of the single track forming the audio record area and a half width of the non-recorded track in each of the guarding areas adjacent to the audio record area at opposite sides of the audio record area for erasing the audio samples recorded in the audio record area; and a second erase head having a width which is n times as wide as said specific track width (n is an integer larger than two), and movable in the track length direction so as to trace the full width of each of specific consecutive (n−1) tracks in the video record area and a half width of each of two tracks adjacent to the specific consecutive (n−1) tracks at opposite sides of the specific consecutive (n−1) tracks for erasing the video samples recorded in the video record area.

5 Claims, 10 Drawing Sheets

VIDEO AND AUDIO SIGNAL RECORDING APPARATUS WITH EDITING-USE ERASE HEADS

BACKGROUND OF THE INVENTION

1. Field of the Invention

The present invention relates to an apparatus for recording signals onto slant tracks of a recording medium with a rotary head, and more particularly to an apparatus having an erase head arranged for erasing recorded signals from narrow recording tracks.

2. Description of the Prior Art

Thanks to improvements in magnetic tapes and recording heads, a magnetic record/playback apparatus having a rotary head has been enhanced in its high density recording capability. For high density recording, various methods are proposed in which the width of each recording track is minimized and the number of tracks to be scanned by the rotary head during a given time is increased. It is usual to decrease the track width for increasing the recording density.

In erasing an editing track by an erase head, problems caused by mechanical error, track deviation, and tape traveling speed variation cause a part of a track adjacent to the editing track to be erased to reduce the track width and cause a part of the editing track to not be erased. Such a reduction in the track width or erasing failure appears more significant as the track becomes narrow. Accordingly, the signals retrieved from the beginning and concluding ends of an editing area of narrow tracks will be attenuated, thus producing a reduced quality image.

A method for minimizing a decline in the quality of a reproduced image of signals for data editing is disclosed in Japanese Laid-open Patent Publication 1-106382 (1989), in which data of each television frame as an editorial unit is recorded on a group of 15 consecutive tracks of a recording medium. In particular, one guarding track is interposed between two groups of tracks and each track is scanned for erasing by an erase head, which has an erasing width 2.5 times greater than the width of the track, so that any two adjacent erased regions are overlap each other by ½ track width. According to the method, the guarding track is scanned ¾ by the erase head during erasing at the beginning and last portions of each editing area, thus leaving ¼ track width as a margin of the guarding track width for the reduction of track width and erasing failure. However, the margin of the guarding track width should be optimumly ½ track width.

SUMMARY OF THE INVENTION

It is an object of the present invention to provide a recorder apparatus for minimizing a decline in the quality of a reproduced image of signals retrieved from the beginning and last portions of an editing area extending through consecutive recording tracks of a narrow width. More specifically, the object of the present invention is to provide a signal recorder having an erase head arranged for improving the margin of the width of each guarding track for the reduction of the track width and erasing failure at the beginning and concluding portions of the editing area of a recording medium.

A video and audio signal recording apparatus for recording video and audio signals on a recording medium, according to the present invention comprises: a video signal dividing means for dividing a video signal into video editorial units each composed of video samples contained within a specific period of time; an audio signal dividing means for dividing an audio signal into audio editorial units each composed of audio samples contained within said specific period of time; a recording means for recording the video and audio signals on the recording medium such that the video samples of each video editorial unit are recorded on a plurality of consecutive tracks each having a specific track width to form a video record area, and such that the audio samples of each audio editorial unit are recorded on a single track having said specific track width to form an audio record area, and such that said video and audio record areas are formed alternately with a guarding area being composed of at least one non-recorded track having said specific track width; a first erase head having a width which is two times as wide as said specific track width and movable in a track length direction so as to trace a full width of said single track forming said audio record area and a half width of said non-recorded track in said guarding areas adjacent to said audio record area at each of opposite sides of said audio record area for erasing the audio samples recorded in said audio record area; and a second erase head having a width which is n times as wide as said specific track width, wherein n is an integer larger than two, and movable in the track length direction so as to trace as full width of each of specific consecutive (n−1) tracks in said video record area and a half width of each of two tracks adjacent to said specific consecutive (n−1) tracks at opposite sides of said specific consecutive (n−1) tracks for erasing the video samples recorded in said video record area.

Preferably, the signal recorder apparatus may include a means for recording video signals such that signals of a plurality of fields are recorded as an edtorial unit in a recording area.

The signal recorder apparatus may include a means for recording audio signals of a channel corresponding to a plurality of fields of video signals into a recording area as an editorial unit.

The signal recorder apparatus may include a means for recording a video signal in an edtorial unit in a part of a track in a recording area and an audio signal in the remaining part of the track so that each recording area is divided into a video recording area and an audio recording area.

The guarding area may have the same width as a width of a track in the recording area.

An audio recording area may be formed by dividing a track into a plurality of areas with a guarding area between each two adjacent divided areas. This track is separated from a track in a video recording area by a guarding area provided therebetween. One editorial unit of audio signals is recorded in one divided area.

In this case, the signal recorder apparatus may have an erase head which has an erasing width two times wider than the track width for erasing the audio recording area.

The apparatus may be configured such that said second erase head id movable in the track length direction so as to trace a full width of a specific track in said video record area and a half width of each of two tracks adjacent to said specific track at opposite sides of said specific track for erasing the video samples recorded in a part of said video record area; or may be configured such that said audio signal dividing means divided the audio samples in each of said audio editorial units into a plurality of audio editorial sub-units each composed of a specific number of audio samples, and wherein said recording means records the audio samples of each of said audio editorial units on said single track in said audio record area such that said audio editorial subunits are respectively recorded in a plurality of division areas arranged in the length direction of said single track with editing gaps provided between each two adjacent division areas.

The apparatus may also be configured such that said video signal dividing means divides the video signal so that each of said video editorial units is composed of video samples contained in a specific number of fields of the video signal or may be configured such that said recording means recording the video and audio signal such that said guarding area formed between adjacent video and audio record areas is composed of a single non-recorded track having said specific track width.

DESCRIPTION OF THE PREFERRED EMBODIMENTS

Figure 2:
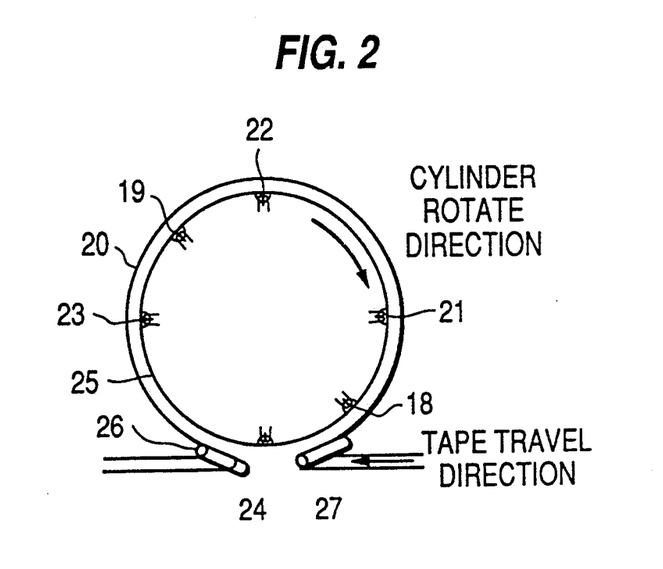
FIG. 2 is a schematic view showing the arrangement of record/erase heads of the first embodiment.

A first embodiment of the present invention will be described in the form of a signal recorder apparatus, in which each unit of television field data is processed as an editorial unit. More particularly, video and audio signals of each field are recorded on their respective recording areas which are spaced from each other by guarding areas whose width is identical to that of a track. Also, the data in the recording areas is erased with an erase head which is twice the width of the track. A scanning system for producing a pattern of recording tracks on a tape will now be explained. FIG. 2 shows a schematic view of a magnetic head drum of the recorder of the first embodiment of the present invention, in which a rotary cylinder 25 is driven by a cylinder motor, not shown, for rotation at a speed of 5 times the frame frequency. As shown, a magnetic tape 20 is guided by guide posts 26 and 27 and wrapped about 270° around the rotary cylinder 25 in the helical arrangement. Four recording heads 21, 22, 23, and 24 are mounted at equal intervals of 90° onto the rotary cylinder 25 for recording input signals on diagonal tracks of the magnetic tape 20 at full track width. In action, one frame data unit is allocated to 20 tracks. An erase head 18 is mounted ahead of the recording head 21 so that it can erase between the center line of a track scanned by the recording head 21 and the center line of another track canned by the recording head 23 prior to recording by those recording heads. Similarly, another erase head 19 is mounted ahead of the recording head 23 so that it can erase between the center line of a track scanned by the recording head 23 and the center line of another track scanned by the recording head 24 prior to recording by those recording heads.

Figure 3:
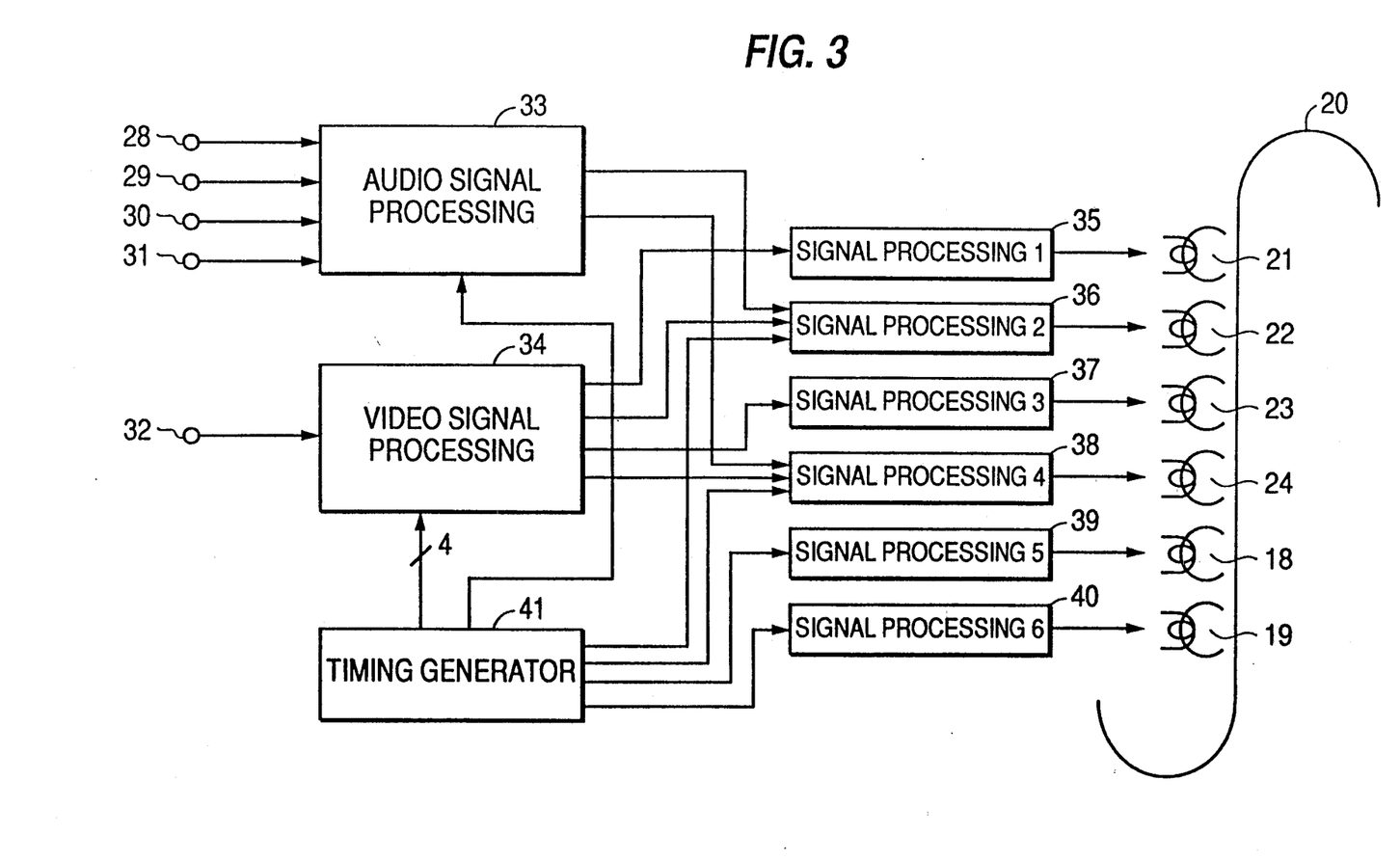
FIG. 3 is a block diagram of a signal processing circuit of the first embodiment.
Figure 4:
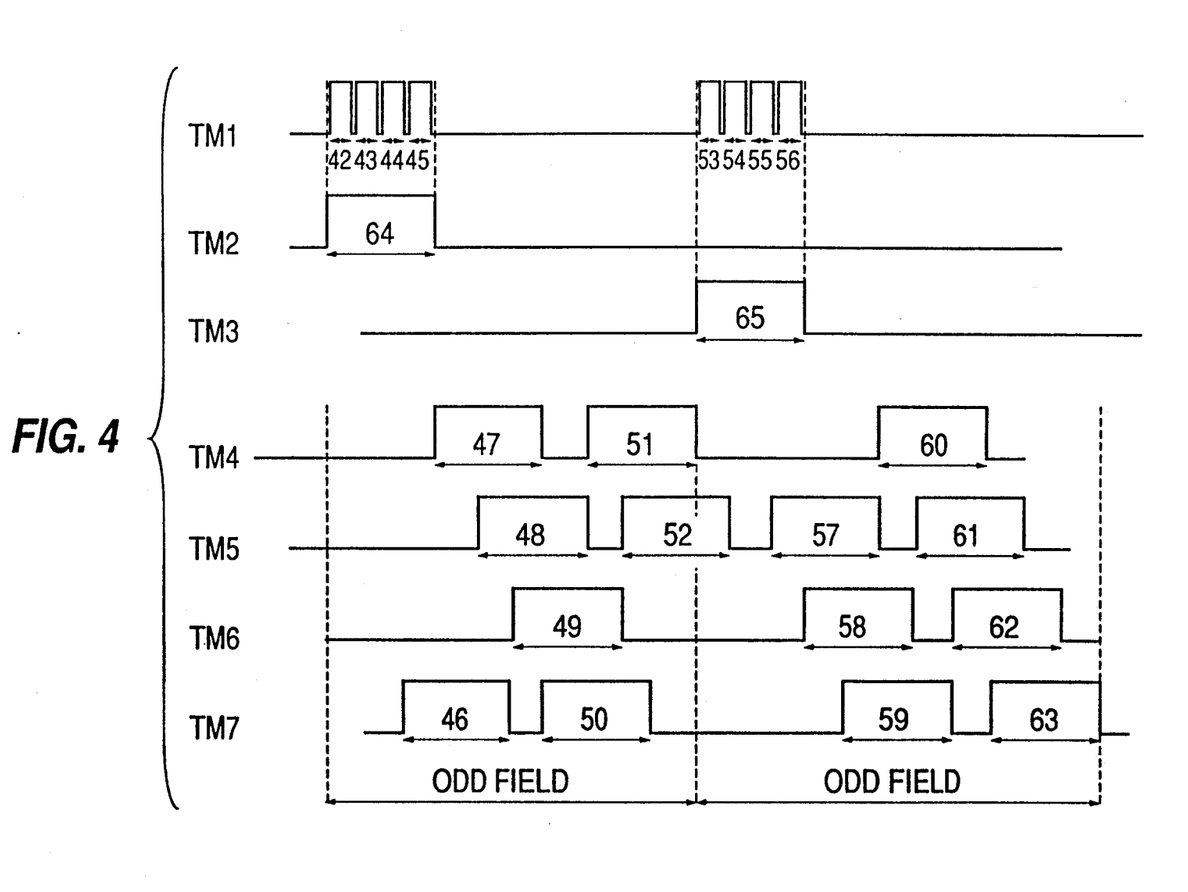
FIG. 4 is a timing chart of the signal processing circuit of the first embodiment.
Figure 11:
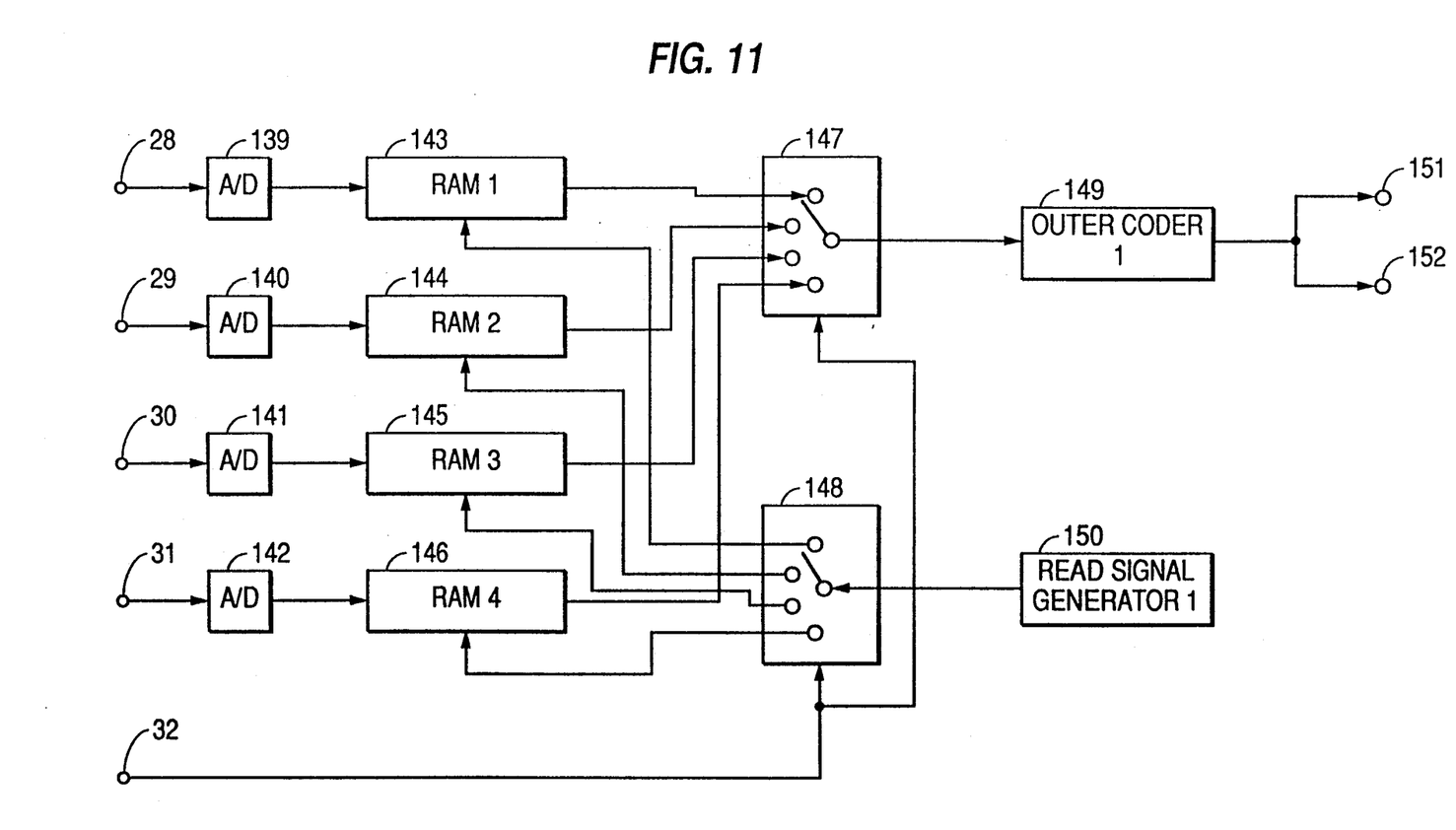
FIG. 11 is a block diagram of an audio signal processor of the signal processing circuit of the first embodiment.
Figure 12:
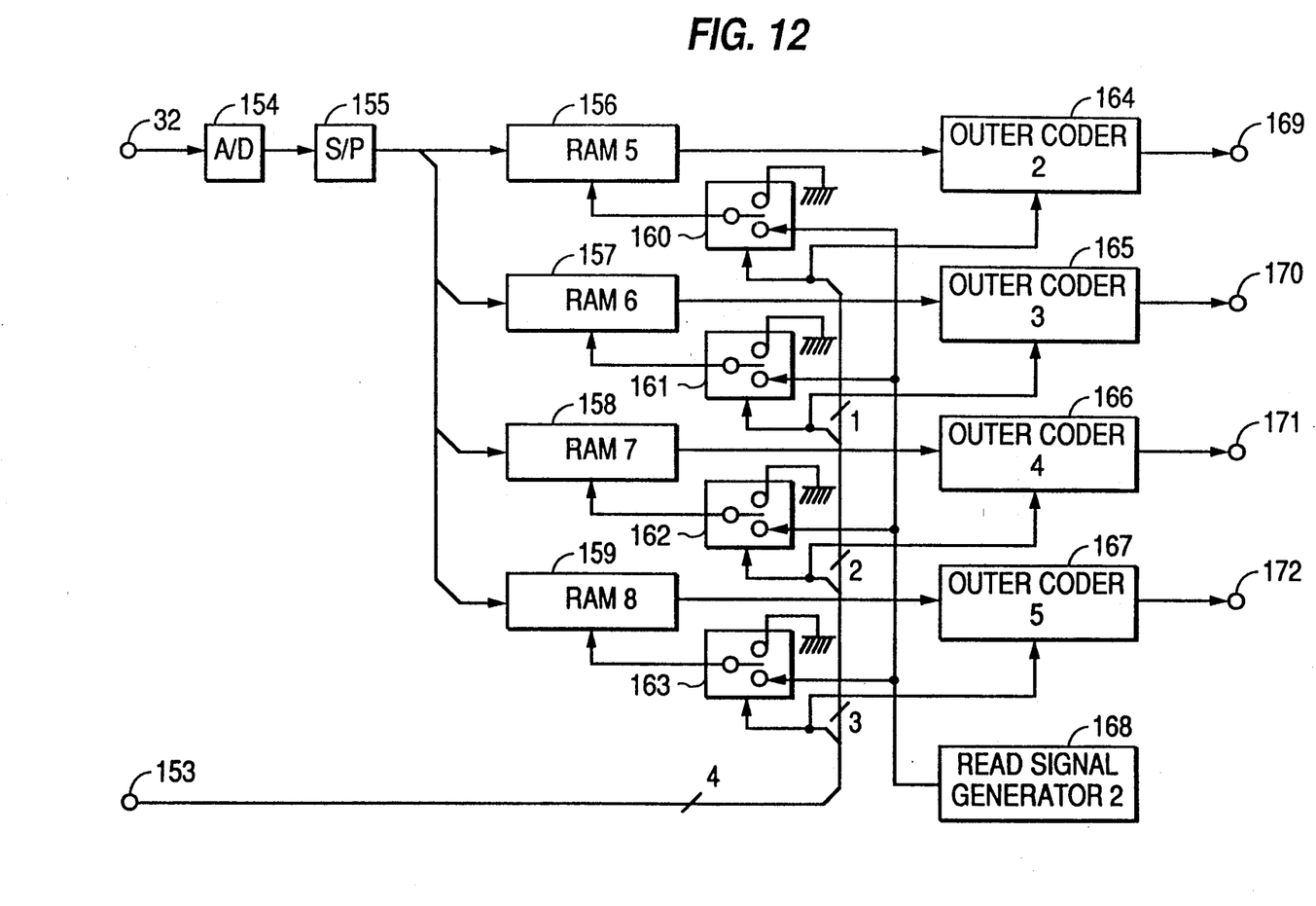
FIG. 12 is a block diagram of a video signal processor of the signal processing circuit of the first embodiment.
Figure 13:
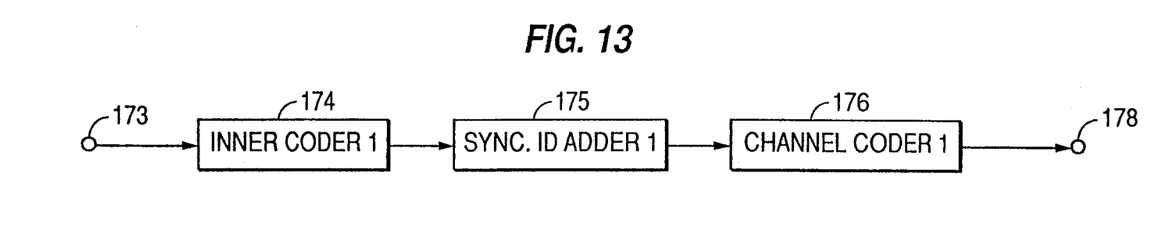
FIG. 13 is a block diagram of a first signal processor of the signal processing circuit of the first embodiment.
Figure 14:
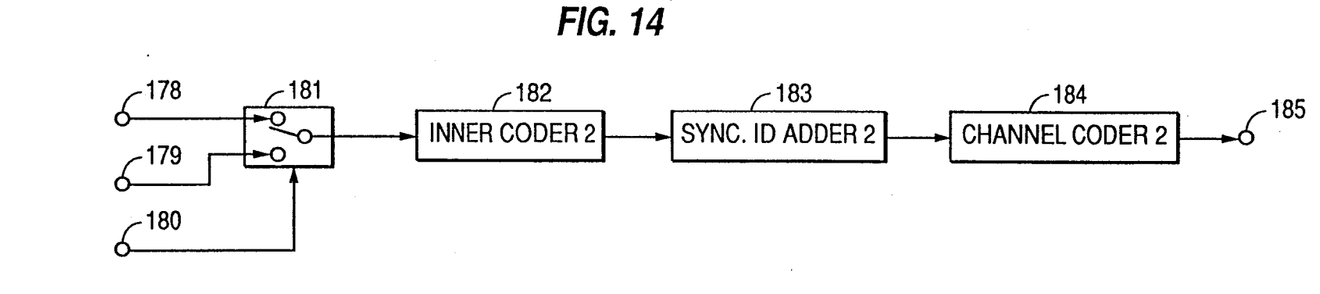
FIG. 14 is a block diagram of a second signal processor of the signal processing circuit of the first embodiment.
Figure 15:
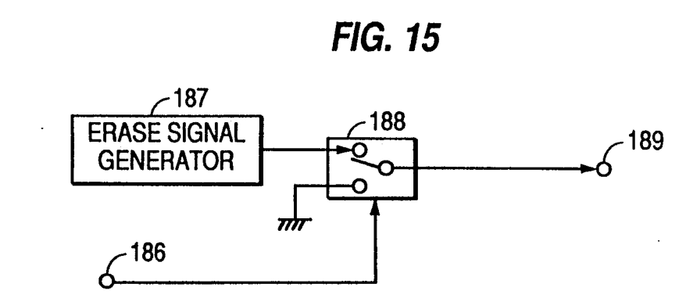
FIG. 15 is a block diagram of a fifth signal processor of the signal processing circuit of the first embodiment.
Figure 16:
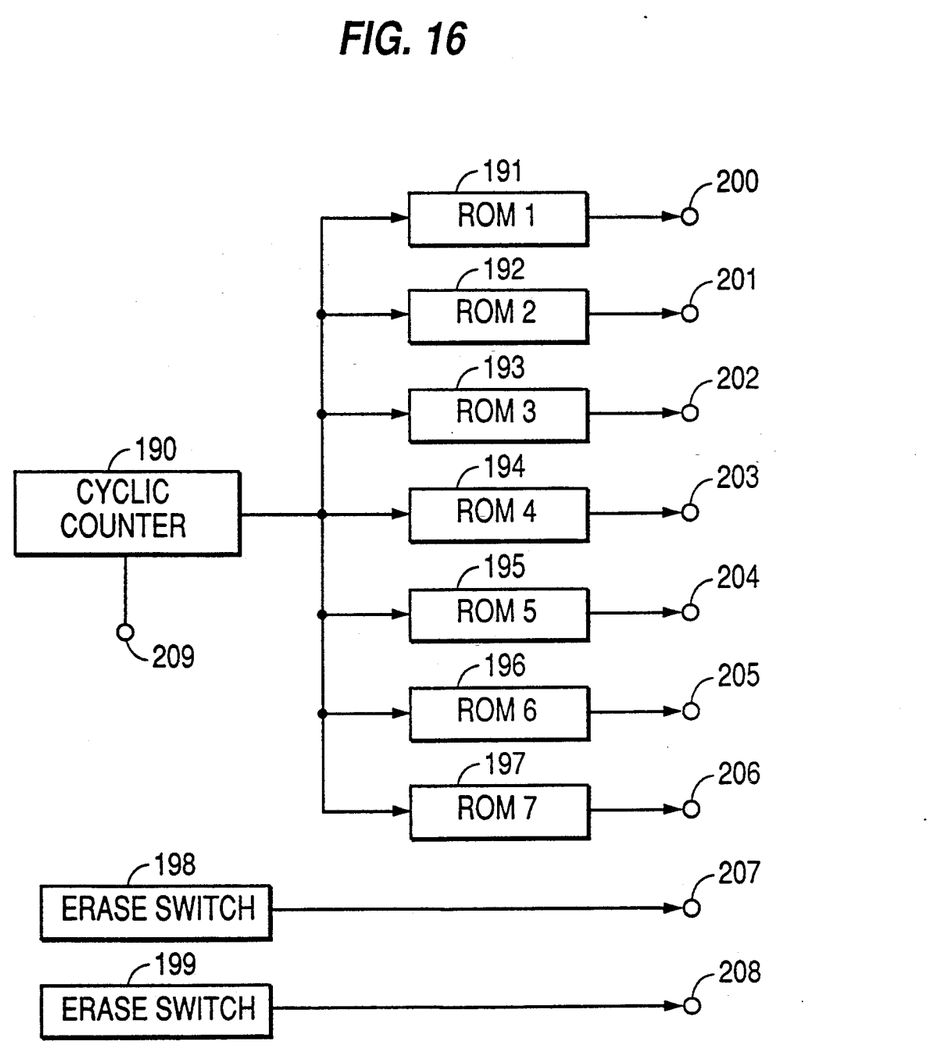
FIG. 16 is a block diagram of a timing pulse generator of the signal processing circuit of the first embodiment.

The operation of a signal processing circuit for feeding discrete signals to their respective recording heads for recording on the pattern of tracks is described as follows. FIG. 3 is a block diagram of the signal processing circuit and FIG. 4 is a timing chart showing the operation thereof. Primary component circuits in the signal processing circuit are shown in more detail in FIGS. 11 to 16; FIG. 11 shows a circuitry diagram of an audio signal processor 33; FIG. 12 is a diagram of a video signal processor 34; FIG. 13 is a diagram of a first signal processor 35 out of six; FIG. 14 is a diagram of a second signal processor 36; FIG. 15 is a diagram of a fifth signal processor 39; and FIG. 16 is a diagram of a timing pulse generator 41.

The timing pulse generator 41 will first be explained referring to FIG. 16. A head switch signal from the rotary cylinder 25 is fed through an input terminal 209 to a cyclic counter 190 of the timing generator 41 which in turn performs a counting action at one-frame intervals in synchronism with the movement of the rotary cylinder 25 and delivers corresponding address signals to a group of ROMs 191, 192, 193, 194, 195, 196, and 197. Upon receiving the address signals, the ROM 191 transmits a timing signal TM1 through an output terminal 200 of the timing generator 41 to the audio signal processor 33. Similarly, the ROMs 192, 193, 194, and 195 deliver timing signals TM2, TM3, TM4, and TM5 across their respective output terminals 201, 202, 203, and 204 to the video signal processor 34. The two ROMs 196 and 197 transmit their respective timing signals TM6 and TM7 through the output terminals 205 and 206 to the second 36 and the fourth signal processor 38 respectively.

The operation of the audio signal processor 33 is explained as follows referring to FIG. 11. Four channels of the audio signal are supplied to input terminals 28, 29, 30, and 31 of the audio signal processor 33 respectively. The four channel signals are then converted by their respective A/D converters 139, 140, 141, and 142 to digital forms which are stored in four RAMs 143, 144, 145, and 146 respectively. When the timing signal TM1 is fed from the timing generator 41 to the audio signal processor 33 for triggering the switching action of two switches 147 and 148, even field components of the channel audio signals are respectively retrieved from the four RAMs during four periods 42, 43, 44, and 45 shown in FIG. 4 and transferred to an outer code imparting circuit 149 where they are supplemented with an outer error correction code before delivery to the second audio signal processor 36. Simultaneously, odd field components of the channel audio signals are retrieved from the RAMs during the periods 53, 54, 55, and 56 respectively and transferred through the outer code imparting circuit 149 to the fourth signal processor 38.

The operation of the video signal processor 34 will be explained referring to FIG. 12. A video signal inputted to an input terminal 32 of the video signal processor 34 is converted by an A/D converter 154 to a digital form which is then transferred to a 4-bit serial-parallel circuit 155. Resultant 4-bit digital video signals are stored in four RAMs 156, 157, 158, and 159 in parallel-by-bit arrangement. When the four timing signals TM4, TM5, TM6, and TM7 are supplied from the timing generator 41 to a terminal 153 of the video signal processor 34, they trigger the switching action of four switches 160, 161, 162, and 163 respectively. Accordingly, even field data of the video signal are read from the four RAMs during corresponding periods 46, 47, 48, 49, 50, 51, and 52 shown in FIG. 4 and odd field data of the video signal are read out during the periods 57, 58, 59, 60, 61, 62, and 63. The video signal components read out during the periods 47, 51, and 60 are fed to an outer code imparting circuit 164 where they are supplemented with an outer error correcting code before delivery through an output terminal 169 to the first signal processor 35. Also, the video signal components read out during the periods 48, 52, 57, and 61 are fed to an outer code imparting circuit 165 where they are supplemented with an outer error correcting code before delivery through an output terminal 170 to the second signal processor 36. The video signal components read out during the periods 49, 58, and 62 are fed to an outer code imparting circuit 166 where they are supplemented with an outer error correcting code before delivery through an output terminal 171 to the third signal processor 37. The video signal components read out during the periods 46, 50, 59, and 63 are fed to an outer code imparting circuit 167 where they are supplemented with an outer error correcting code before delivery through an output terminal 172 to the fourth signal processor 38.

The operation of the first 35, second 36, third 37, and fourth signal processor 38 is described as follows. As shown in FIG. 13, the digital video signal from the video signal processing circuit 34 is fed from an input terminal 173 to an inner code imparting circuit 174 of the first signal processor 35 where it is supplemented with an inner error correcting code. The digital video signal accompanied by the error correcting codes is also consolidated with a SYNC code and an ID code at a SYNC/ID imparting circuit 175 and then, processed by e,g, modulation by a channel coder 176 before delivery to the recording head 21. In the second signal processor 36, as shown in FIG. 14, the timing signal TM2 from the timing pulse generator 41 is supplied from an input terminal 180 to a switch 181 which thus allows the digital audio signals from the audio signal processing circuit 33 to be fed through its terminal 178 during a given period 64 and processed prior to delivery to the recording head 22. Otherwise, the digital video signals from the video signal processing circuit 34 are fed from a terminal 179 through the switch 181 to the second signal processor 36 for processing and further delivery to the recording head 22. The third signal processor 37 is identical in the circuit arrangement to the first signal processor 35, in which the video signals from the video signal processing circuit 34 are processed and transferred to the recording head 23. Also, the fourth signal processor 38 is identical in the arrangement to the second signal processor 36 and when receiving the timing signal TM 3, feeds the audio signals from the audio signal processing circuit 33 during a period 65 and after processing, delivers it to the recording head 24. During the other period, the video signals from the video signal processing circuit 34 are input for processing and then, transferred to the recording head 24.

Figure 1:
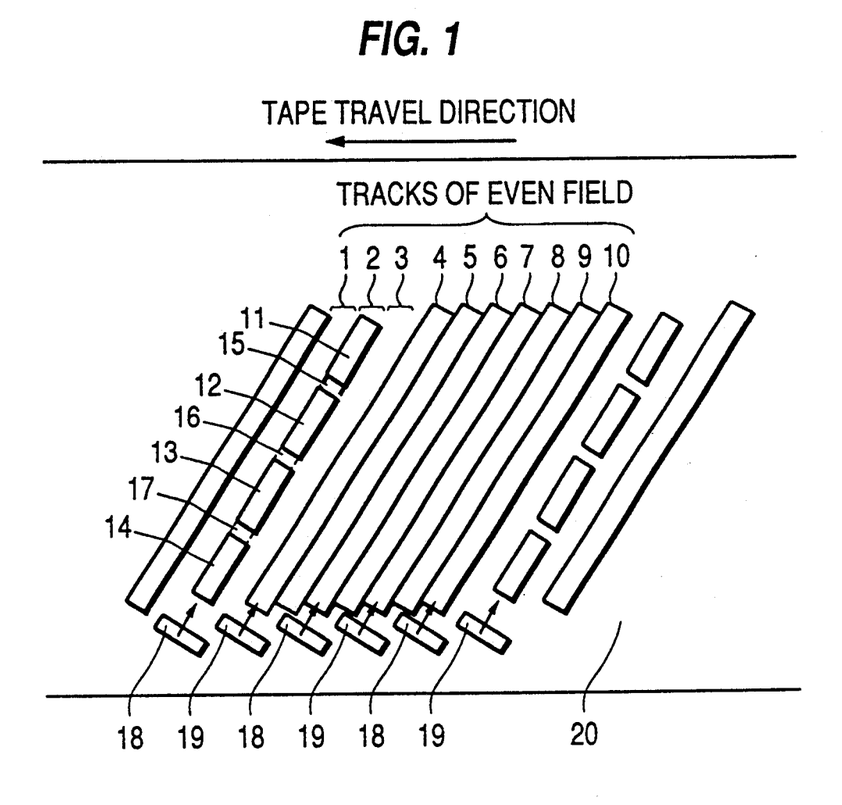
FIG. 1 is a view of a track pattern showing both video and audio recording areas and guarding areas to be scanned by erase heads in one direction according to a first embodiment of the present invention.

The pattern of the tracks developed by recording action of the recording heads corresponding to signals from their respective signal processors is explained as follows. FIG. 1 shows a recording pattern of even field tracks executed by the first embodiment of the present invention, in which the 4-channel audio signals for one field are recorded on audio recording areas 11, 12, 13, and 14 of the track 2 respectively. The video signal of the same field is recorded on the video recording areas of the tracks 4 to 10. Three guarding areas 15, 16, and 17 are arranged between the two adjacent audio recording areas 11 and 12, 12 and 13, and 13 and 14 respectively. Two more guarding areas 1 and 3 are provided between the video and audio recording areas. The recording of the 4-channel audio signals onto the four audio recording areas 11, 12, 13, and 14 is carried out with the recording head 22 during the periods 42, 43, 44, and 45 respectively. The guarding areas 15, 16, and 17 between the audio recording areas remain unrecorded. The video recording tracks 4 to 10 hold the even field video data corresponding to their respective periods 46 to 52. The guarding area 1 appears before the period 47 and is equal to one track holding no video signal to be scanned by the recording head 21. Similarly, the guarding area 3 appears before the period 49 and is equal to one track holding no video signal to be scanned by the recording head 23.

Figure 5:
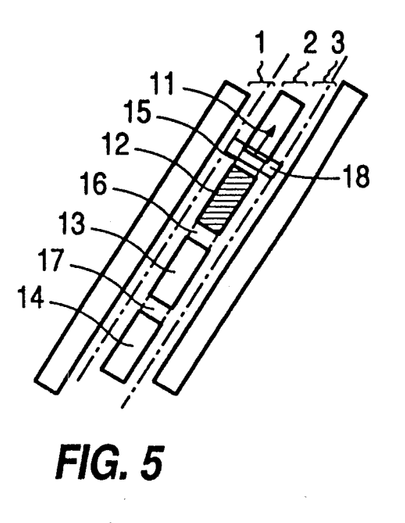
FIG. 5 is a view of the track pattern of the first embodiment showing an erasing action on one of the audio recording areas.

The erase action of the erase head is as follows, referring to FIGS. 5 to 7. The description starts with an erase procedure for eliminating a one-channel audio signal from the audio recording area. FIG. 5 illustrates the erasing of a second channel audio signal of even field data stored in the audio recording area 12 on the first embodiment of the present invention. The erase head 18 which has an erasing width twice that of the rack width is arranged for performing an erase action between the center line of the guarding area 1 and the center line of the guarding area 3. When an erase switch 198 of the timing generator 41 is turned on at the timing of scanning of the erase head 18 along the audio recording area 12, an erase pulse is transferred through an output terminal 207 to an input terminal 186 of the fifth signal processor 39 shown in FIG. 15. The erase pulse triggers the switching action of a switch 188 and thus, an erase signal is transferred from an erase signal generator 187 via an output terminal 189 to the erase head 18 which in response eliminates audio data from the audio recording area 12. The audio recording area 12 is surrounded by the guarding areas so that a track width reduction and erase failure do not occur, except that an error due to a mechanical error, track deviation, or tape traveling speed variation exceeds more than ½ of the track width. In normal conditions, the error due to the mechanical error, track deviation, or tape traveling speed variation remains less than the ½ track width and thus, no erasing error will be involved.

Figure 6:
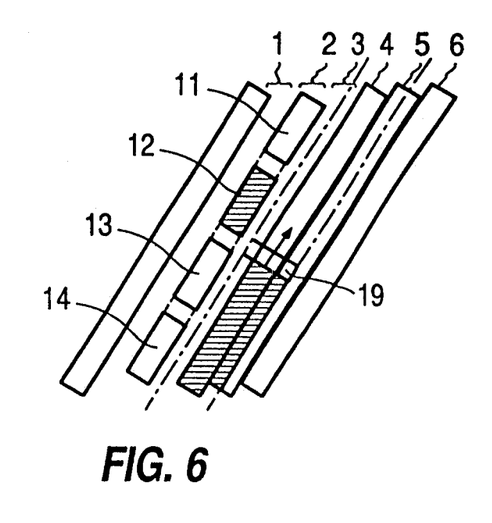
FIG. 6 is a view of the track pattern of the first embodiment showing en erasing action at the beginning end of the video recording area.

FIG. 6 shows an erase procedure for eliminating video data from the outer track of an editing video recording area which is adjacent to the audio recording areas in this example. The erase head 19 has an erasing width twice the track width so as to erase throughout its width between the center line of the guarding area 3 and the center line of the track 5. The sixth signal processor 40 is identical to the fifth signal processor 39. When an erase switch 199 of the timing generator 41 is turned on at the timing of scanning of the erase head 19 along the video recording area, an erase pulse is fed to the sixth signal processor 40 which in turn delivers an erase signal to the erase head 19. Accordingly, video data is eliminated from the full track 4 and a half the track 5, as shown in FIG. 6 where the hatched region represents an erased area. The guarding area 3 is interposed between the audio recording areas and the video recoding area so that a track width reduction and erase failure do not occur when an error due to a mechanical error, track deviation, or tape traveling speed variation stays not more than ½ of the track width. As the result, no erasing error will be involved.

Figure 7:
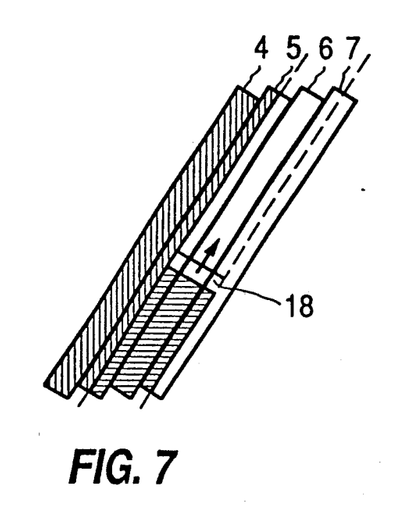
FIG. 7 is a view of the track pattern of the first embodiment showing an erasing action in an intermediate part of the video recording area.

FIG. 7 illustrates an erase procedure for eliminating video data from the inner tracks of an editing video recording area, according to the first embodiment of the present invention. The erase head 18 is capable of erasing throughout its width between the center line of the track 5 and the center line of the track 7. When the erase switch 198 of the timing generator 41 is turned on at the timing of scanning of the erase head 18 along the video recording area, an erase pulse is fed to the fifth signal processor 39 which in turn delivers an erase signal to the erase head 18. Consequently, video data is eliminated from a half the track 5, the full track 6, and a half the track 7, as shown in FIG. 7 where the hatched region represents an erased area. Even if unerased portions are left behind due to a mechanical error, track deviation, or tape traveling speed variation, they are along the center line of each track and can be eliminated by overwriting with the recording head 21 during recording. Similarly, the remaining tracks of the video recording area will be erased using both the erase heads 18 and 19.

As set forth above, the audio recording areas holding channel audio signals are spaced from each other and more specifically, unrecording areas having a width equal to that of the track and a given length are interposed between the two adjacent audio recording areas and between the audio recording areas and the video recording area, so that each channel audio signal can be edited individually. Also, one track of unrecording area is interposed between the audio signal recorded region and the video signal recorded region for each field data, whereby deficient erasing on the target track or excessive erasing on the adjacent track will be avoided if such mechanical error, track deviation, or tape traveling speed variation remains less than ½ of the track width. Even if unerased portions are found in the erase scanned track due to the mechanical error, track deviation, or tape traveling speed variation, they appear along the center line of the track and can be eliminated by over-writing data during the following recording action. Hence, the accuracy in mounting of components, adjustment of the same, and feeding of a magnetic tape during editing will be eased.

A second embodiment of the present invention will now be described referring to FIGS. 8 and 9. According to the second embodiment, each unit of television frame data as one editorial data is recorded in the form of a video signal and an audio signal separately onto their respective recording areas. The recorded data is erased with two erase heads which are two times and six times the width of the track respectively. FIG. 9 is a schematic view of a head drum of the second embodiment showing a scanning mechanism for producing a pattern of tracks on a magnetic tape. A rotary cylinder 25 rotates at a speed of 5 times the frame frequency. The magnetic tape 20 is guided by guide posts 26 and 27 and wrapped about 180° around the rotary cylinder 25 in the helical form. The rotary cylinder 25 has a pair of four-recording-head units, 121 and 122 arranged at 180° apart from each other for producing 40 diagonal recording tracks per frame on the magnetic tape 20. An erase head 124 is provided before the recording head unit 121 for erasing throughout its width between the center line of a first track 66 scanned by the head unit 121 and the center line of a third track 68 prior to recording with the head unit 121. Also, an erase head 124 is arranged ahead of the recording head unit 121 for erasing throughout its width between the center line of the third track 68 scanned by the head unit 121 and the center line of a track 74 next to the track scanned by the head unit 122 prior to recording with the units 121 and 122.

Figure 8:
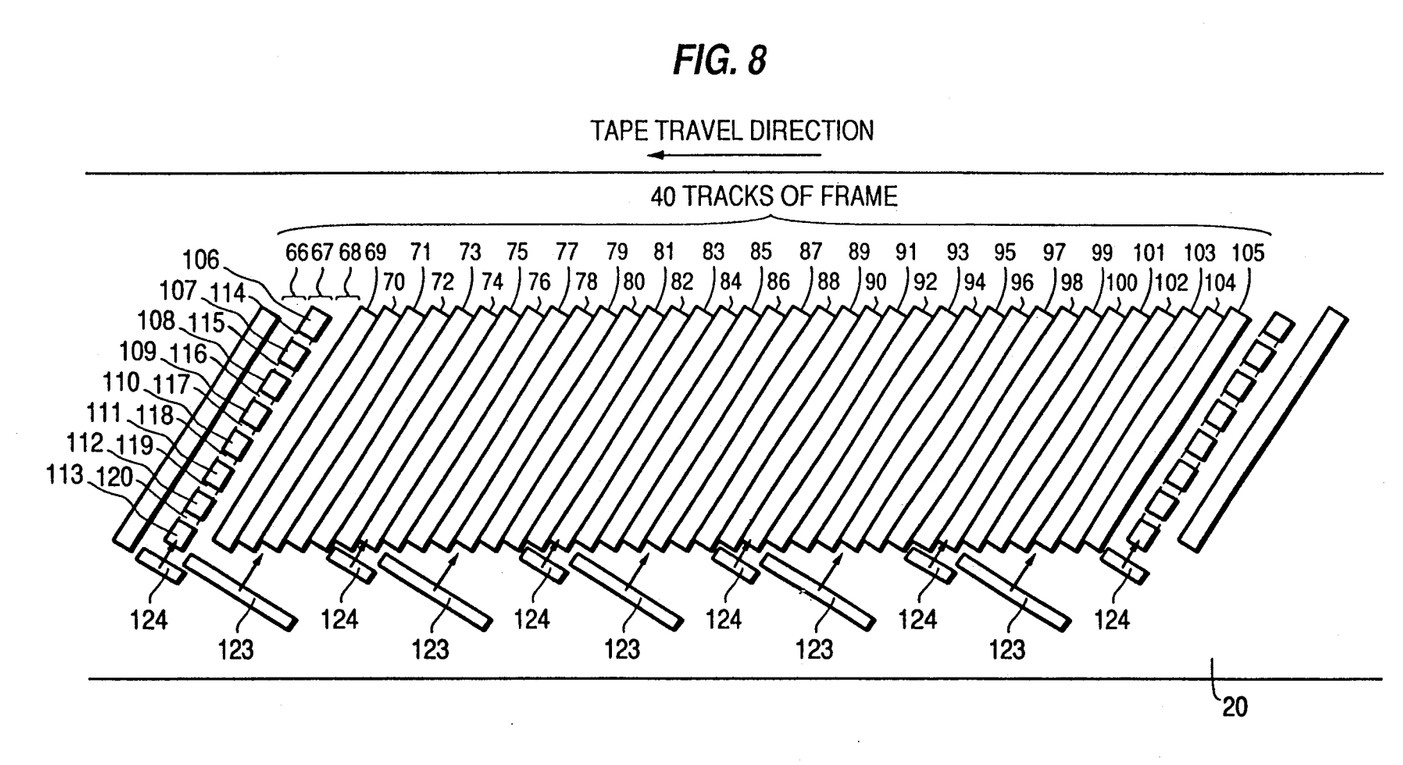
FIG. 8 is a view of a track pattern showing both video and audio recording areas and guarding areas to be scanned by erase heads in one direction according to a second embodiment of the present invention.
Figure 9:
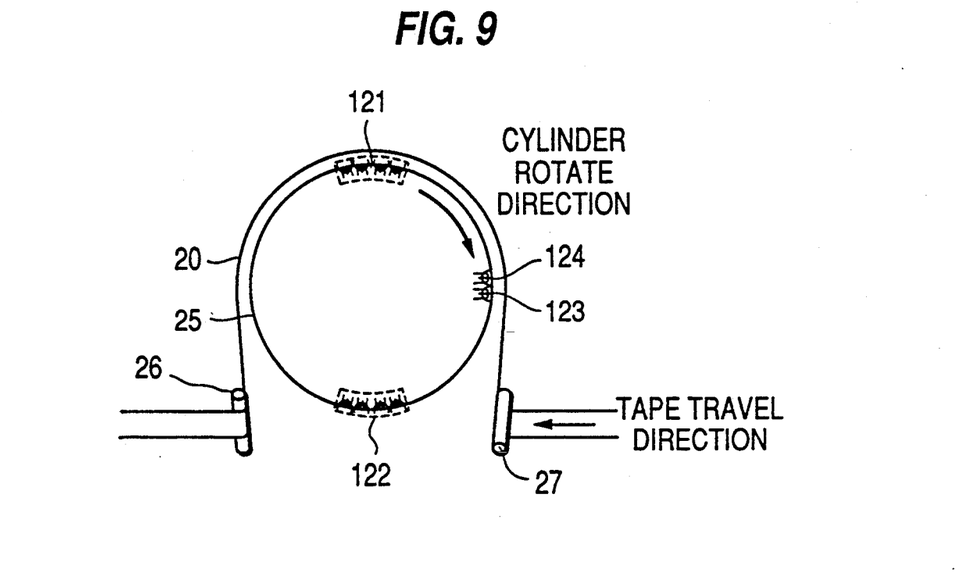
FIG. 9 is a schematic view showing the arrangement of record/erase heads of the second embodiment.

FIG. 8 shows the pattern of the tracks for one frame data produced by the foregoing scanning mechanism of the second embodiment, in which the track 67 contains eight audio recording areas 106 to 113 for storage of 8 channel audio signals of the frame respectively. The eight audio recording areas are spaced by seven guarding areas 114 to 120 which hold no audio signals. The video recording area comprises 37 tracks 69 to 105 for storage of the video signal of the frame. Two guarding areas 66 and 68 are unrecording tracks arranged for being scanned by the first and third recording heads of the head unit 121 respectively and interposed between the audio recording areas and the video recording area.

The erase head 124 scans throughout its erasing width of two times the track width between the center line of the guarding area 66 and the center line of the guarding area 68 for erasing and thus, eliminates target audio data from the audio recording areas 106 to 113. Video data on the video recording area are eliminated by alternately scanning with the two erase heads 123 and 124, the former having an erasing width of 6 times the track width. As understood, each erase head is arranged to scan with both side ends thereof tracing the center lines of their respective tracks. Hence, at the beginning and concluding ends of the video recording area, the erase head 123 scans a half of the guarding area so that no audio data can be erased with erratic manners while video data is duly erased. During scanning in the video recording area, the two erase heads 123 and 124 travel so that their erasing trails are directly side by side. If portions of the video data remain unerased, they are along the center line of the track and will automatically be eliminated by overwriting at the succeeding recording.

Although the erasing width of the erase head is twice the width of the track in the foregoing embodiment, it may be equal to m times the track width (m is an integer more than 2).

Figure 10:
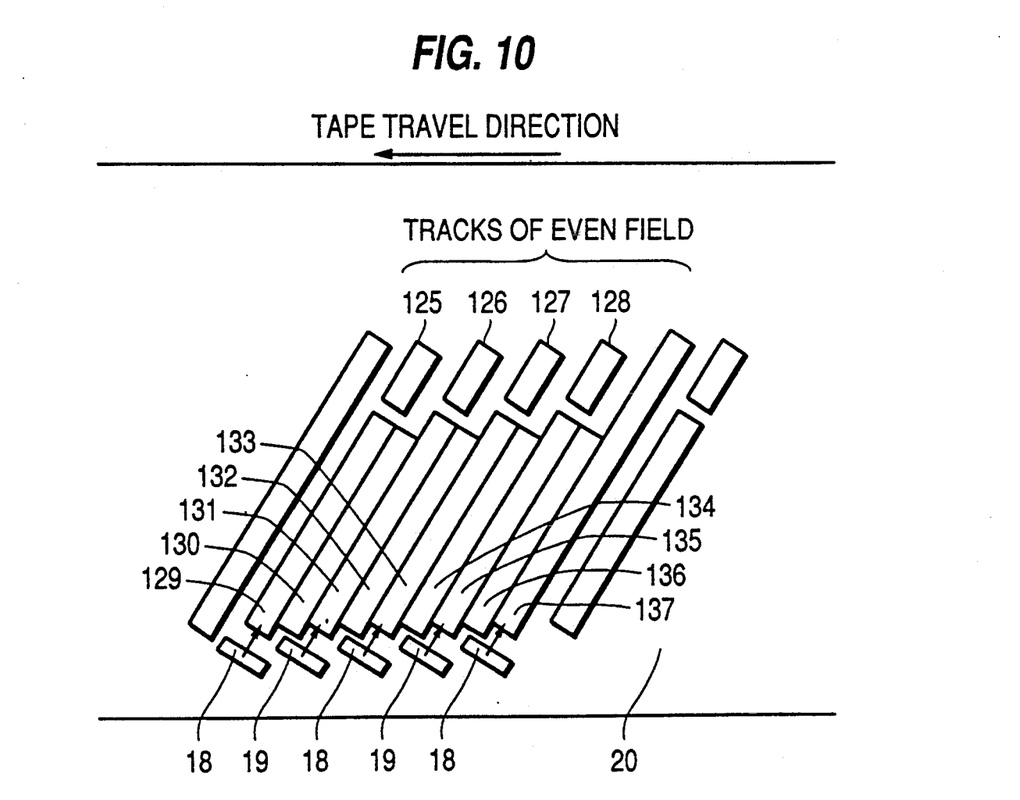
FIG. 10 is a view of a track pattern according to a third embodiment of the present invention.

It would be understood that the present invention is applicable without concerning the number of recording heads, the wrapping angle of a magnetic tape on the rotary cylinder, the number of audio signal channels, and the rotational speed of the rotary cylinder. Although the present invention is explained for the case in which the audio signal of each field or frame is recorded onto one single track, the present invention is not limited to an audio signal. For example, a time code signal, a stereo channel signal, or other extra signals can be recorded separately onto the recording areas of a track with equal success. Although the video and audio signals are recorded for each field or frame, they may be stored in units of fields or frames. Although the audio signal of a given period is recorded onto a plurality of recording areas corresponding to discrete channels, its different channel components may be stored onto one recording area or segments of one channel signal thereof may be stored onto the plural recording areas respectively. The recording areas for the audio signal are not limited to one track and eight ¼-track recording areas may extend throughout two tracks. Although the video and audio signals are recorded in their respective recording areas in the embodiments, they may separately be stored in the same track. This will be explained in more detail as a third embodiment of the present invention. FIG. 10 shows the video signal of one field stored on nine ⅔-track recording areas 129 to 137. Also, four channels of the audio signal of the field are recorded onto four ¼-track recording areas 125 to 128 respectively. The scanning mechanism for producing this pattern of the tracks is identical to that of the first embodiment shown in FIG. 1. Both the video and audio recording areas are scanned with the two erase heads 18 and 19 for erasing and as the result, two different recording areas in one single track will be erased with equal success. The width of each guarding area of this embodiment is preferably equal to that of the track but not compulsorily. The guarding area may be slightly less or an integer number of times the width of the track.

What is claimed is:

1. A video and audio signal recording apparatus for recording video and audio signals on a recording medium, comprising:
    a video signal dividing means for dividing a video signal into a video editorial units each composed of video samples contained within a specific period of time;
    an audio signal dividing means for dividing an audio signal into audio editorial units each composed of audio samples contained within said specific period of time;
    a recording means for recording the video and audio signals on the recording medium such that the video samples of each video editorial unit are recorded on a plurality of consecutive tracks each having a specific track width to form a video record area, and such that the audio samples of each audio editorial unit are recorded on a single track having said specific track width to form an audio record area, and such that said video and audio record areas are formed alternately with a guarding area therebetween, said guarding area being composed of at least one non-recorded track having said specific track width;
    a first erase head having a width which is two times as wide as said specific track width and movable in a track length direction so as to trace a full width of said single track forming said audio record area and a half width of said non-recorded track in said guarding areas adjacent to said audio record area at each of opposite sides of said audio record area for erasing the audio samples recorded in said audio record area; and
    a second erase head having a width which is n times as wide as said specific track width, wherein n is an integer larger than two, and movable in the tack length direction so as to trace as full width of each of specific consecutive (n−1) tracks in said video record area and a half width of each of two tracks adjacent to said specific consecutive (n−1) tracks at opposite sides of said specific consecutive (n−1) tracks for erasing the video samples recorded in said video record area.

2. An apparatus according to claim 1, wherein said second erase head is movable in the track length direction so as to trace a full width of a specific track in said video record area and a half width of each of two tracks adjacent to said specific track at opposite sides of said specific track for erasing the video samples recorded in a part of said video record.

3. An apparatus according to claim 1, wherein said audio signal dividing means divides the audio samples in each of said audio editorial units into a plurality of audio editorial sub-units each composed of a specific number of audio samples, and wherein said recording means records the audio samples of each of said audio editorial units on said single track in said audio record area such that said audio editorial sub-units are respectively recorded in a plurality of division areas arranged in the length direction of said single track with editing gaps provided between each two adjacent division areas.

4. An apparatus according to claim 1, wherein said video signal dividing means divides the video signal so that each of said video editorial units is composed of video samples contained in a specific number of fields of the video signal.

5. An apparatus according to claim 1, wherein said recording means recording the video and audio signals such that said guarding area formed between adjacent video and audio record areas is composed of a single non-recorded track having said specific track width.

* * * * *